(12) United States Patent
Makino et al.

(10) Patent No.: US 9,601,790 B2
(45) Date of Patent: Mar. 21, 2017

(54) FUEL CELL SYSTEM AND CONTROL METHOD OF FUEL CELL SYSTEM

(75) Inventors: Shinichi Makino, Vancouver (CA); Yasushi Ichikawa, Kanagawa (JP); Michihiko Matsumoto, Fujisawa (JP); Mitsunori Kumada, Yokosuka (JP); Yoshitomo Asai, Stuttgart (DE)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 427 days.

(21) Appl. No.: 14/127,631

(22) PCT Filed: Apr. 3, 2012

(86) PCT No.: PCT/JP2012/059079
§ 371 (c)(1),
(2), (4) Date: Dec. 19, 2013

(87) PCT Pub. No.: WO2012/176528
PCT Pub. Date: Dec. 27, 2012

(65) Prior Publication Data
US 2014/0120439 A1 May 1, 2014

(30) Foreign Application Priority Data
Jun. 21, 2011 (JP) ................................. 2011-137298

(51) Int. Cl.
*H01M 8/04* (2016.01)
*H01M 8/10* (2016.01)

(52) U.S. Cl.
CPC ... *H01M 8/04223* (2013.01); *H01M 8/04365* (2013.01); *H01M 8/04552* (2013.01); *H01M 8/04559* (2013.01); *H01M 8/04753* (2013.01); *H01M 2008/1095* (2013.01); *Y02E 60/50* (2013.01)

(58) Field of Classification Search
CPC ........................................................ H01M 8/04
See application file for complete search history.

(56) References Cited

U.S. PATENT DOCUMENTS

| 2005/0106431 A1 | 5/2005 | Edlund et al. |
| 2006/0003205 A1 | 1/2006 | Yoshida et al. |
| 2007/0026273 A1* | 2/2007 | Okamoto .......... H01M 8/04097 429/414 |

(Continued)

FOREIGN PATENT DOCUMENTS

| JP | 2004-172028 A | 6/2004 |
| JP | 2005-100820 A | 4/2005 |

(Continued)

OTHER PUBLICATIONS

Supplementary European Search Report dated Nov. 13, 2014, 5 pgs.
Japanese Office Action dated Jul. 29, 2014, 5 pgs.

*Primary Examiner* — Jacob Marks
(74) *Attorney, Agent, or Firm* — Foley & Lardner LLP

(57) ABSTRACT

In a fuel cell system which executes a stop process of stopping an output from a fuel cell when a required power generation amount for the fuel cell is smaller than a predetermined power generation amount and supplies oxidant during a stop process period, fuel gas is intermittently supplied to a fuel electrode at a basic supply interval, which is set in advance and at which carbon dioxide is not generated in an oxidant electrode, during the stop process period.

17 Claims, 29 Drawing Sheets

(56) References Cited

U.S. PATENT DOCUMENTS

| | | | |
|---|---|---|---|
| 2008/0220303 A1* | 9/2008 | Yoshida | H01M 8/04097 |
| | | | 429/423 |
| 2009/0087702 A1 | 4/2009 | Yonekura et al. | |
| 2009/0123787 A1 | 5/2009 | Shimoi et al. | |
| 2009/0214901 A1 | 8/2009 | Dong et al. | |
| 2009/0253000 A1* | 10/2009 | Song | H01M 8/04238 |
| | | | 429/447 |
| 2010/0009219 A1 | 1/2010 | Kwon et al. | |
| 2010/0047643 A1 | 2/2010 | Yukimasa et al. | |
| 2010/0209793 A1 | 8/2010 | Kamiyama et al. | |

FOREIGN PATENT DOCUMENTS

| | | |
|---|---|---|
| JP | 2005-158555 | 6/2005 |
| JP | 2005-235522 A | 9/2005 |
| JP | 2007-250429 A | 9/2007 |
| JP | 2008-541337 A | 11/2008 |
| JP | 4182732 B2 | 11/2008 |
| JP | 4432312 B2 | 3/2010 |
| JP | 2010-192191 A | 9/2010 |
| JP | 2010-277837 A | 12/2010 |
| WO | WO 2004/049488 A2 | 6/2004 |
| WO | WO 2009/037864 A1 | 3/2009 |
| WO | WO 2010/039109 A1 | 4/2010 |

* cited by examiner

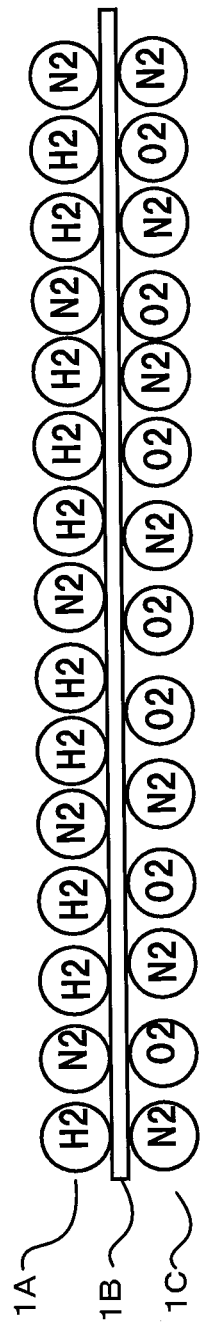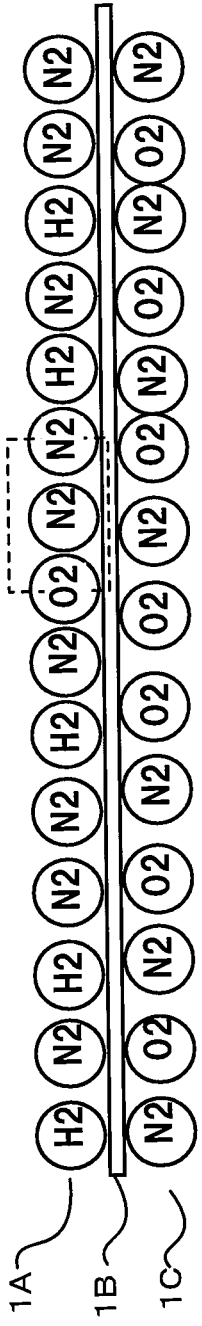

FUEL CELL SYSTEM AND CONTROL METHOD OF FUEL CELL SYSTEM

TECHNICAL FIELD

This invention relates to a supply control of fuel gas to a fuel cell.

BACKGROUND ART

A stop process of stopping an output from a fuel cell by stopping the supply of fuel gas and oxidation gas to the fuel cell when a required power generation amount for the fuel cell is smaller than a predetermined power generation amount, so-called an idle stop is known as a control of fuel gas.

In the case of operating the fuel cell again in an idle stop state, a time is required which is sufficient for a voltage to increase up to a required voltage after the start of an electrochemical reaction after the supply of the fuel gas and the oxidation gas is resumed. Thus, in the case of using the fuel cell as a vehicle drive source, required power cannot be immediately output even if an accelerator pedal is depressed during an idle stop. Such low responsiveness has caused a reduction in drivability. Accordingly, in JP4182732, fuel gas or oxidation gas is supplied at a predetermined timing during an idle stop to ensure responsiveness regardless of required power.

Even if the supply of the fuel gas and the oxidation gas is stopped, the fuel gas and the oxidation gas remaining in the fuel cell continue to chemically react due to permeation through an electrolyte membrane. If the fuel gas is consumed by the chemical reaction of the fuel gas and the oxidation gas having permeated, an anode internal pressure decreases and oxygen permeates through the electrolyte membrane during the idle stop to cross-leak to an anode side. As a result, a state occurs where oxygen is unevenly distributed in an anode (hereinafter, referred to as an uneven distribution of gas). If the uneven distribution increases, a hydrogen front is formed by the oxygen unevenly distributed in the anode when the operation of the fuel cell is resumed to supply the fuel gas and the oxidation gas, which results in the deterioration of an electrode catalyst. Specifically, carbon carrying platinum as the electrode catalyst reacts with water produced by an electrochemical reaction in a cathode, thereby being changed to carbon dioxide. The platinum carried on the carbon elutes to reduce a catalytic function.

To prevent such deterioration of the electrode catalyst by the hydrogen front, fuel gas is supplied when an uneven distribution of gas is detected during an idle stop in JP4432312. It should be noted that a pressure, density, electrode voltage or the like in the anode is detected by a sensor and the uneven distribution of gas is detected based on that detection value.

SUMMARY OF INVENTION

One pressure sensor or the like can detect an entire internal state of the anode, but cannot detect a local state. On the other hand, the uneven distribution of gas locally occurs. Accordingly, it is difficult to detect the uneven distribution of gas by a pressure sensor or the like as in JP4432312. If it is attempted to detect by a pressure sensor or the like, it is necessary to arrange a multitude of sensors, which is not realistic in terms of cost and layout.

On the other hand, if hydrogen is supplied as fuel gas during an idle stop as in JP4182732, the formation of a hydrogen front can be prevented by preventing the cross-leak of oxygen. Thus, it is thought to be possible to prevent the deterioration of the electrode catalyst. However, since the fuel gas is supplied during the idle stop at a timing set in terms of ensuring responsiveness when a return is made from the idle stop in JP4182732, the hydrogen front may be formed to deteriorate the electrode catalyst.

Accordingly, an object of the present invention is to provide a device capable of suppressing the deterioration of an electrode catalyst caused by an idle stop without using a pressure sensor or the like.

To achieve the above object, in the present invention, an idle stop for stopping an output from a fuel cell is executed when a required power generation amount for the fuel cell is smaller than a predetermined power generation amount and oxidant is supplied during the idle stop. Further, fuel gas is intermittently supplied to a fuel electrode at a basic supply interval, which is set in advance and at which carbon dioxide is not generated in an oxidant electrode, during the idle stop.

Details and other features and advantages of this invention are described in the following description and shown in the accompanying drawings.

BRIEF DESCRIPTION OF DRAWINGS

FIG. 2A is a view showing a cross-section of a unit cell during normal driving, FIG. 2B is a view diagrammatically showing a cross-section of the unit cell during an idle stop.

DESCRIPTION OF EMBODIMENTS

First Embodiment

Figure 1:
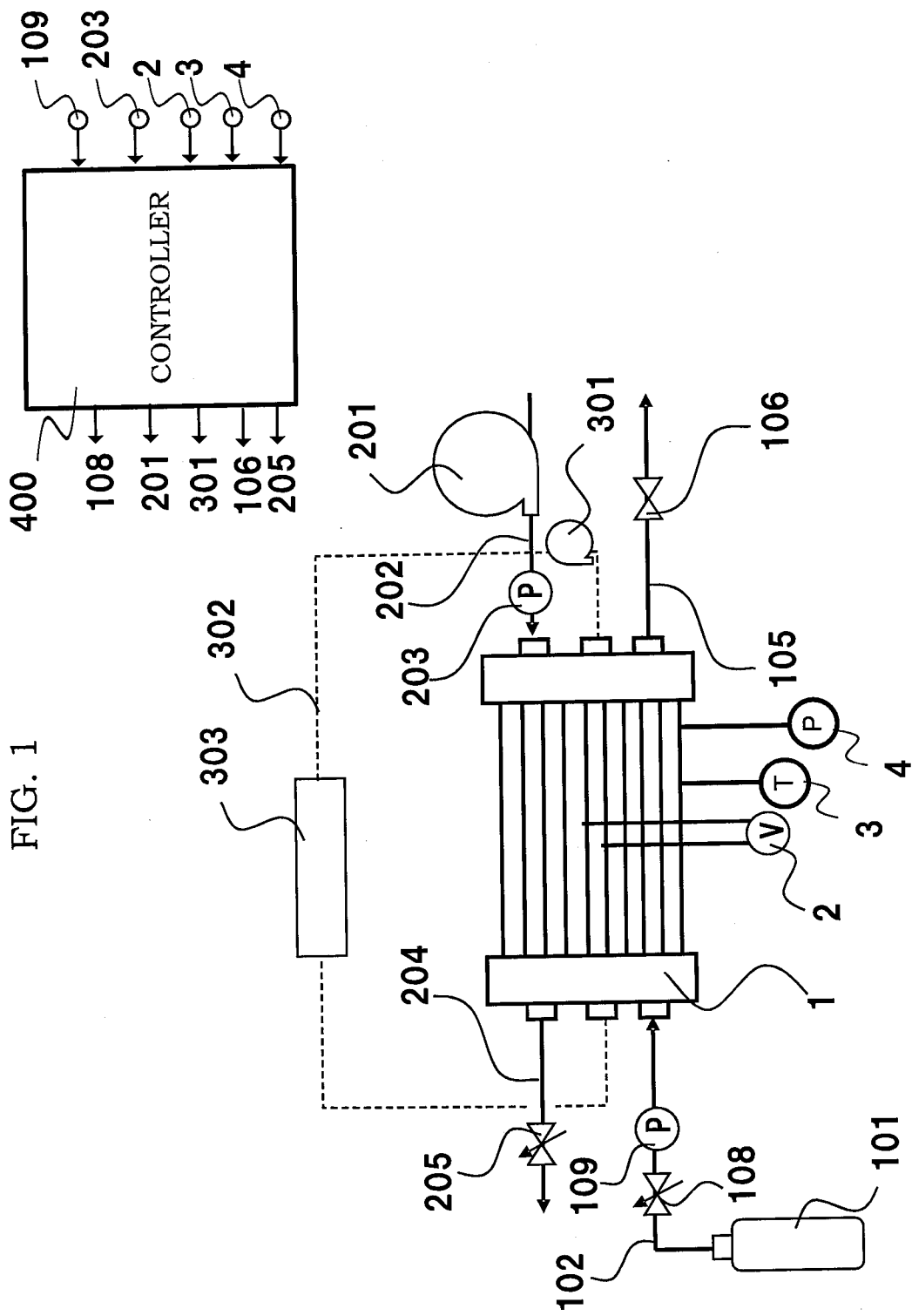
FIG. 1 is an overall configuration diagram of a fuel cell system according to an embodiment of the present invention.

FIG. 1 is an overall configuration diagram of a fuel cell system according to an embodiment of the present invention. This fuel cell system is mounted in an electric vehicle which is driven by an electric motor.

The fuel cell system includes a fuel cell stack 1, a hydrogen tank 101 for storing hydrogen gas as fuel gas, a compressor blower 201 for supplying air as oxidation gas and a controller 400 for controlling this system.

The fuel cell stack 1 is configured similarly to a known fuel cell stack. That is, the fuel cell stack 1 is a laminated body of cells, which are basic units of a fuel cell, and each cell is so configured that a fuel electrode and an oxidant electrode are arranged to sandwich an electrolyte membrane formed with catalyst layers on opposite surfaces. The catalyst layer is so configured that carbon carries platinum as an electrode catalyst.

Hydrogen in the hydrogen tank 101 passes in a hydrogen supply pipe 102 and is supplied to a fuel electrode (hereinafter, referred to as an anode 1A) of the fuel cell stack 1 while being reduced to a desired pressure by a hydrogen system pressure regulating valve 108.

The hydrogen system pressure regulating valve 108 regulates a pressure by regulating the flow rate of hydrogen supplied to the fuel cell stack 1. It should be noted that a hydrogen system pressure sensor 109 is interposed between the hydrogen system pressure regulating valve 108 in the hydrogen supply pipe 102 and the fuel cell stack 1. The controller 400 controls the hydrogen system pressure regulating valve 108 so that a detection value of the hydrogen system pressure sensor 109 reaches a desired pressure. An exhaust (hereinafter, referred to as anode off-gas) from the anode 1A such as hydrogen gas and other impurities supplied extra for the amount of hydrogen necessary for an electrochemical reaction in the fuel cell stack 1 flows out to a hydrogen exhaust pipe 105. An exhaust hydrogen purge valve 106 is disposed in the hydrogen exhaust pipe 105. When the exhaust hydrogen purge valve 106 is opened, anode off-gas is exhausted from the hydrogen exhaust pipe 105 to the outside of the system.

It should be noted that the system of FIG. 1 is a so-called anode system dead-end system in which anode off-gas is not circulated from the hydrogen exhaust pipe 105 to the hydrogen supply pipe 102.

Air fed under pressure by the compressor blower 201 is supplied to the oxidant electrode (hereinafter, referred to as a cathode) of the fuel cell stack 1 through an air supply pipe 202. It should be noted that an air system pressure sensor 203 is disposed in the air supply pipe 202. After being consumed by the electrochemical reaction in the fuel cell stack 1, the supplied air flows out to an air exhaust pipe 204 and is regulated to a desired pressure in an air system back pressure regulating valve 205 and exhausted to the outside of the system. The air system back pressure regulating valve 205 is controlled based on a detection value of the air system pressure sensor 203 by the controller 400.

The controller 400 is configured by a microcomputer including a central processing unit (CPU), a read only memory (ROM), a random access memory (RAM) and an input/output interface (I/O interface). The controller 400 can also be configured by a plurality of microcomputers.

Further, the fuel cell system includes a cooling system for removing heat generated by power generation. The cooling system includes a cooling water system pipe 302, and a cooling water pump 301 and a radiator 303 disposed in the cooling water system pipe 302. Cooling water fed under pressure by the cooling water pump 301 absorbs heat of the fuel cell stack 1 by passing through the fuel cell stack 1, exhausts heat in the radiator 303 by passing in the cooling water system pipe 302, and is fed under pressure to the fuel cell stack 1 again by the cooling water pump 301.

In addition to the hydrogen system pressure regulating valve 108 and the air system back pressure regulating valve 205, the compressor blower 201, the cooling water pump 301 and the exhaust hydrogen purge valve 106 are also controlled by the controller 400.

A voltage of the fuel cell stack 1 is calculated based on a detection value of a cell voltage sensor 2. The cell voltage sensor 2 is for detecting a voltage of a unit cell or a cell group composed of a plurality of unit cells. Accordingly, a voltage of the entire fuel cell stack 1 can be estimated from the detection value of the cell voltage sensor 2 if it is known how many unit cells are laminated in the fuel cell stack 1.

It should be noted that the voltage of the entire fuel cell stack 1 may be directly detected by detecting a potential difference between opposite ends of the fuel cell stack 1 in a lamination direction.

Detection values of a temperature sensor 3 for detecting temperature of the fuel cell stack 1 (hereinafter, referred to as fuel cell temperature) and of a pressure sensor 4 for detecting a pressure of an anode side are also read into the controller 400.

In the fuel cell system configured as described above, the controller 400 executes an idle stop of stopping an output from the fuel cell stack 1 if a required power generation amount determined from an operating state is smaller than a predetermined power generation amount set in advance.

Specifically, the supply of hydrogen and air to the fuel cell stack 1 is stopped and the extraction of the output from the fuel cell stack 1 is stopped.

If the required power generation amount increases and exceeds the predetermined required power generation amount during the idle stop such as when a driver depresses an accelerator pedal, the controller 400 puts the fuel cell system back to operation. However, it takes time until the electrochemical reaction is resumed and the voltage increases to a target voltage after the restart of the fuel cell system is determined and the supply of hydrogen and air is resumed. Particularly, if an idle stop time is long and the fuel cell system is restarted in a state where a remaining amount of hydrogen and a remaining amount of oxygen in the fuel cell stack 1 are small, a considerable time is required. Specifically, in the case of the restart according to the depression of the accelerator pedal by the driver during the idle stop in the electric vehicle, an output corresponding to a depressed amount of the accelerator pedal cannot be generated until a target voltage is reached, wherefore responsiveness is reduced.

Accordingly, a method is known in which a voltage per unit cell is maintained at a desired voltage, e.g. 0.6 V or higher by intermittently or continuously operating the compressor blower 201 during an idle stop to avoid such a reduction in responsiveness.

If the idle stop is executed, oxygen cross-leaks to the anode 1A side to cause an uneven distribution of gas. Here, the uneven distribution of gas is described.

FIG. 2(A) is a view showing a cross-section of a unit cell during normal driving and FIG. 2(B) is a view diagrammatically showing a cross-section of the unit cell during the idle stop.

During normal driving, hydrogen H2 is present in the anode 1A and oxygen O2 is present in the cathode at opposite sides of an electrolyte membrane. It should be noted that N2 denotes nitrogen contained in the air fed under pressure by the compressor blower 201. Nitrogen N2 at the anode 1A side is a part of nitrogen N2 in the air supplied to the cathode, which part has intruded into the anode 1A side by permeating through the electrolyte membrane.

If the supply of hydrogen and air is stopped for the idle stop in a normal driving state in this way, oxygen permeating from the cathode to the anode 1A side through the electrolyte membrane remains without flowing to a downstream side, whereby the uneven distribution of gas occurs.

Figure 3:
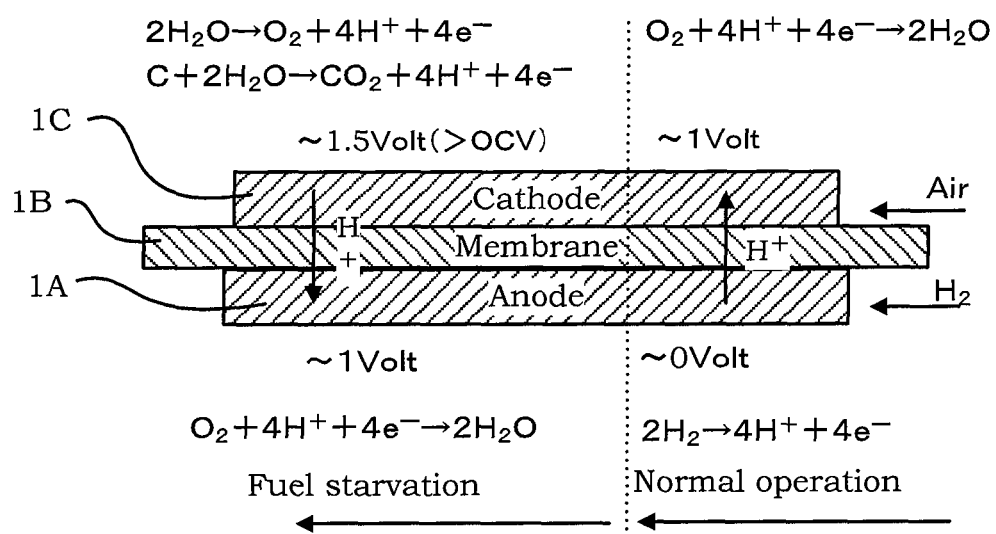
FIG. 3 is a sectional view of the unit cell for the explanation of the deterioration of an electrode catalyst.

FIG. 3 is a sectional view of a unit cell for the explanation of the deterioration of the electrode catalyst that occurs when the fuel cell system is restarted in a state with the uneven distribution of gas.

In a fuel cell, an electrolyte membrane 1B is sandwiched between an anode 1A and a cathode 1C and power is generated by supplying anode gas (fuel gas) containing hydrogen to the anode 1A and cathode gas (oxidant gas) containing oxygen to the cathode 1C. Electrode reactions which proceed in the both electrodes of the anode 1A and the cathode 1C are as follows.

$$\text{Anode electrode}: 2H_2 \rightarrow 4H^+ + 4e^- \quad (1)$$

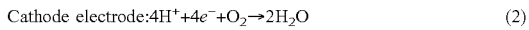

$$\text{Cathode electrode}: 4H^+ + 4e^- + O_2 \rightarrow 2H_2O \quad (2)$$

The fuel cell generates an electromotive force of about 1 V by these electrode reactions (1), (2).

In the case of using such a fuel cell as a power source for automotive vehicle, the fuel cell stack 1 formed by laminating several hundreds of fuel cells is used since required power is large. Then, a fuel cell system for supplying anode gas and cathode gas to the fuel cell stack 1 is constructed and power for driving the vehicle is extracted.

If the fuel cell system is started and the anode gas is supplied to a flow passage of the anode 1A side, a state is reached where the anode gas is present on an upstream side and the cathode gas is present on a downstream side. Then, a local cell is formed in the anode 1A and carbon in a catalyst layer of the cathode 1C may be deteriorated. Such carbon deterioration causes a reduction in an output of a unit cell 20.

As shown in FIG. 3, if the fuel cell system is started and the anode gas is supplied to the anode 1A side in a state where the cathode gas is present in the anode gas side, a state is reached where the anode gas is present on an upstream side of the flow passage for the anode gas and the cathode gas is present on a downstream side. That is, a boundary surface (hydrogen front) between the anode gas and the cathode gas is present in the flow passage for the anode gas.

Then, a normal cell is formed on an upstream side of the unit cell and the reactions of the aforementioned equations (1) and (2) occur.

On the other hand, in a state where the cathode gas is present on the downstream side of the flow passage for the anode gas, a local cell using the upstream side of the flow passage for the anode gas as an anode and the downstream side as a cathode is formed on the anode side. Since this causes electrons generated in the equation (1) to be consumed on the downstream side of the unit cell, a reaction of the following equation (3) occurs in the anode, with the result that a reaction of the following equation (4) occurs in the cathode 1C.

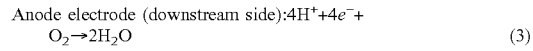

$$\text{Anode electrode (downstream side)}: 4H^+ + 4e^- + O_2 \rightarrow 2H_2O \quad (3)$$

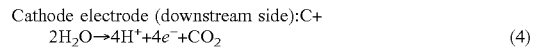

$$\text{Cathode electrode (downstream side)}: C + 2H_2O \rightarrow 4H^+ + 4e^- + CO_2 \quad (4)$$

Since an oxidation reaction (reaction of equation (4)) to change carbon into carbon dioxide occurs on the downstream side of the cathode 1C, a carbon carrier carrying an electrode catalyst such as platinum is corroded to deteriorate the catalyst.

The uneven distribution of gas needs to be suppressed to prevent such deterioration of the catalyst. A method is known in which hydrogen is supplied to the anode 1A side during the idle stop to suppress the uneven distribution of gas. According to this method, the uneven distribution of gas is resolved since oxygen having cross-leaked to the anode 1A is consumed by reacting with hydrogen.

In the case of supplying hydrogen, a supply timing and a supply amount need to be set. For example, a technique is known which supplies hydrogen during an idle stop such as at a timing at which a stack voltage drops for the purpose of ensuring responsiveness when restarting the fuel cell system after the idle stop. However, at such a timing, supplied hydrogen may possibly become insufficient for a cross-leak amount of oxygen. In this case, oxygen remains without being consumed by the electrochemical reaction and the uneven distribution of gas cannot be suppressed. Contrary to this, a case may possibly occur where a hydrogen supply amount becomes excessive for the cross-leak amount of oxygen and hydrogen is wasted. Specifically, it is important to supply an appropriate amount of hydrogen at an appropriate timing to suppress the uneven distribution of gas. Particularly such as when the supply amount is determined in terms of ensuring responsiveness, it is important at which timing hydrogen is supplied.

Accordingly, in the present embodiment, a control described below is executed to suppress the uneven distribution of gas.

Figure 4:
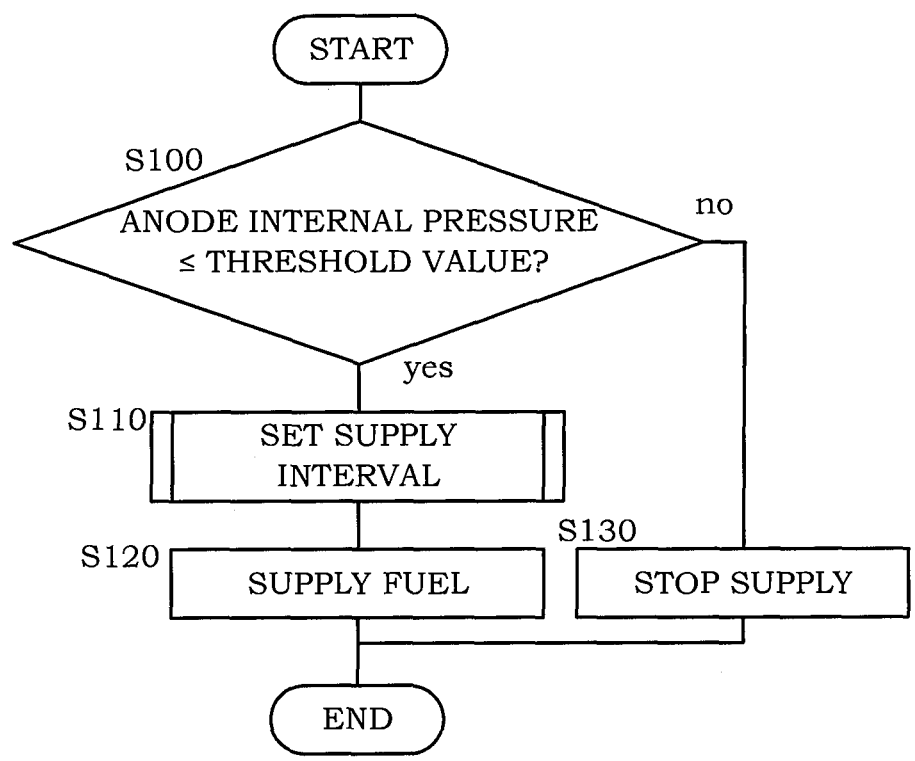
FIG. 4 is a flow chart showing a control routine for hydrogen supply during the idle stop executed by a controller in a first embodiment.

FIG. 4 is a flow chart showing a control routine for hydrogen supply during an idle stop executed by the controller 400. This control routine is repeatedly executed, for example, at a time interval of about 10 msec.

Figure 6:
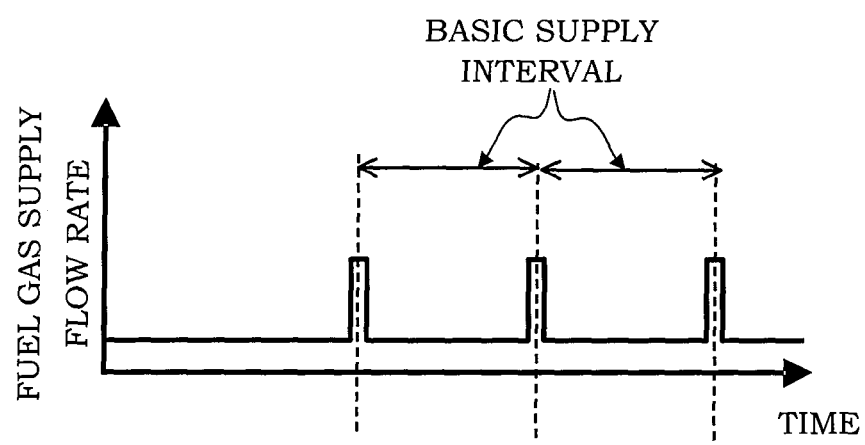
FIG. 6 is a time chart showing an example of hydrogen supply timings.

In this control routine, pulsation is generated in a flow passage by intermittently supplying hydrogen as shown in FIG. 6, thereby agitating unevenly distributed oxygen to enhance responsiveness. In FIG. 6, a vertical axis represents a flow rate of hydrogen per unit time and a horizontal axis represents time. It should be noted that a hydrogen supply amount per one time, i.e. a product of a flow rate per unit time and a time during which that flow rate is maintained is equal to a supply amount in the case of supplying hydrogen to ensure the aforementioned responsiveness. A supply interval is described later.

In Step S100, the controller 400 determines whether or not an anode side pressure is not higher than a threshold value set in advance. A detection value of the hydrogen system pressure sensor 109 is read as an internal pressure of the anode 1A. If the internal pressure of the anode 1A is not higher than the threshold value, the processing of Step S110 is performed. If the internal pressure of the anode 1A is higher than the threshold value, the supply of hydrogen is prohibited in Step S130. This is to prevent the deterioration of the electrolyte membrane due to a pressure difference between the anode A1 side and the cathode 1C side caused by an increase in the pressure of the anode 1A side by the supply of hydrogen. Accordingly, a pressure difference capable of preventing deterioration is obtained by an experiment or the like for each electrolyte membrane to which the present embodiment is applied and this is set as a threshold value.

Figure 32:
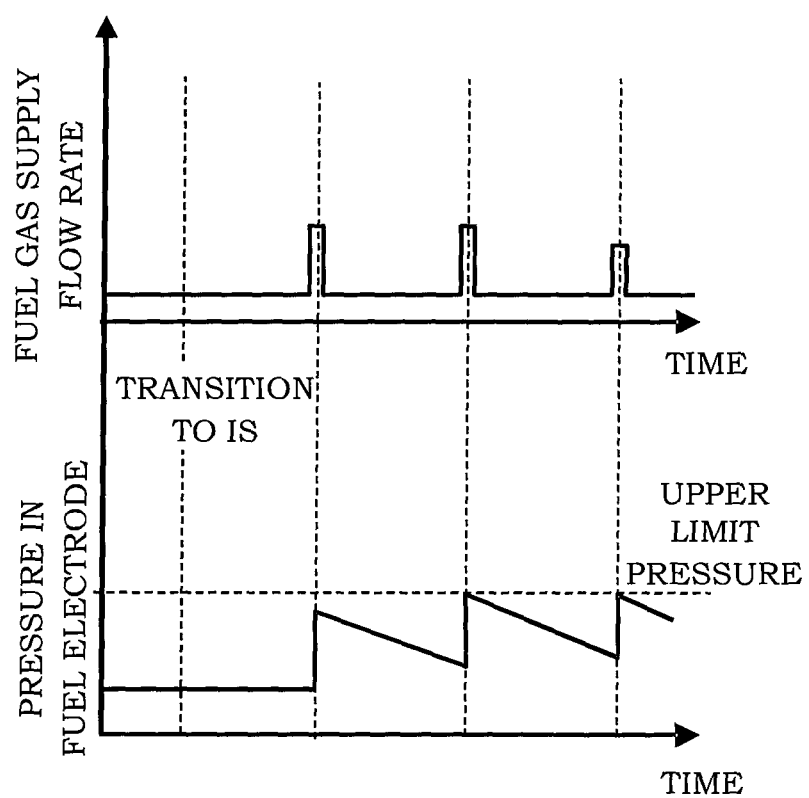
FIG. 32 is a time chart of an anode internal pressure when hydrogen is supplied during the idle stop.

It should be noted that although the pressure increases by the supply of hydrogen as shown in a time chart of FIG. 32, it decreases thereafter as an electrochemical reaction with oxygen proceeds. When hydrogen is supplied next time, the pressure increases again. The anode internal pressure gradually increases while these pressure increase and decrease are repeated.

In Step S110, the controller 400 sets a hydrogen supply interval according to a subroutine described later. In this control routine, a supply interval which is basic (hereinafter, referred to as a basic supply interval) is set in advance by an experiment or the like. For example, the supply interval is changed while a generation amount of carbon dioxide in the cathode 1C is monitored, and an upper limit supply interval below which carbon dioxide is not generated is set as a supply interval upper limit value and the supply interval is set to or below this supply interval upper limit value. Here, the generation amount of carbon dioxide in the cathode is monitored because carbon dioxide is generated in the cathode side due to a reaction shown by the aforementioned equation (4) if there is an uneven distribution of gas. That is, the presence or absence of the uneven distribution of gas can be judged based on the generation amount of carbon dioxide in the cathode side. It should be noted that the generation amount of carbon dioxide can be grasped by detecting an emission amount of carbon dioxide from the cathode.

Figure 7:
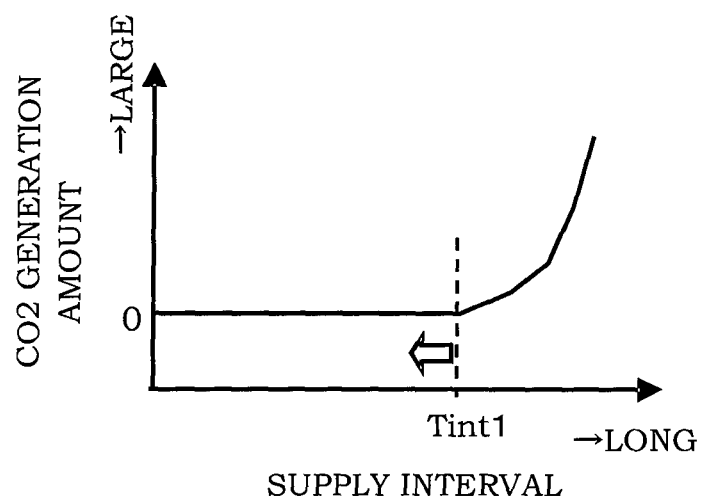
FIG. 7 is a graph showing a relationship between hydrogen supply interval and carbon dioxide generation amount in a cathode.

FIG. 7 is a graph showing a relationship between hydrogen supply interval and carbon dioxide generation amount in the cathode. A vertical axis represents the carbon dioxide generation amount and a horizontal axis represents the supply interval. As shown in FIG. 7, carbon dioxide is not generated if the supply interval is not longer than Tint 1. However, if the supply interval exceeds Tint, the carbon dioxide generation amount increases with an increase in the supply interval. Thus, the basic supply interval is set, for example, at Tint 1 or shorter.

It should be noted that since the relationship between carbon dioxide generation amount and supply interval differs for each specification of the electrolyte membrane, an experiment is conducted to set the supply interval for each electrolyte membrane to be applied.

In the subroutine in Step S110, the basic supply interval set in advance by the above operation is corrected as in any one of examples described below and this is set as the supply interval.

Example 1

Figure 5:
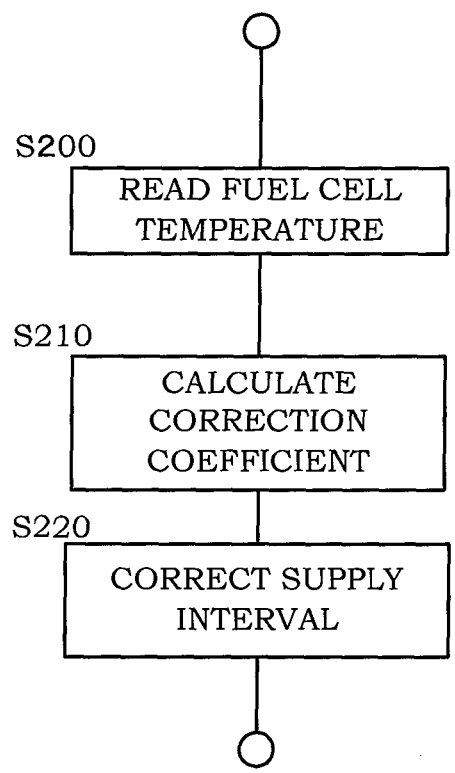
FIG. 5 is a subroutine for supply interval correction executed by the controller in the first embodiment.

FIG. 5 is a subroutine for correcting the supply interval executed by the controller 400 in Step S110.

In Step S200, the controller 400 reads fuel cell temperature. The fuel cell temperature may be directly detected by the temperature sensor 3 or may be estimated from temperature of the cooling water or outside temperature.

Figure 8:
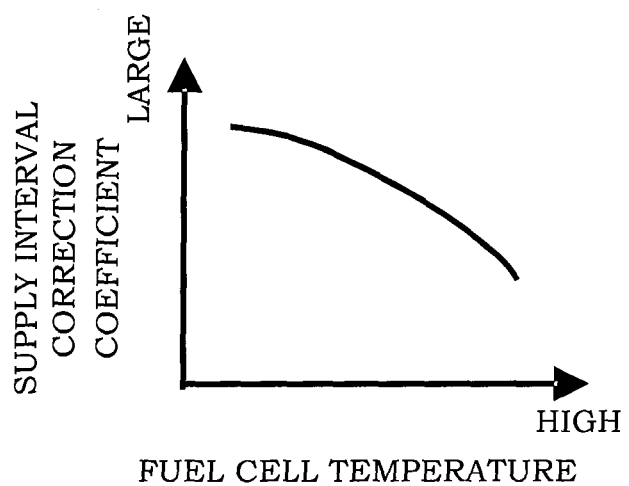
FIG. 8 is a map showing a relationship between fuel cell temperature and supply interval correction coefficient.

In Step S210, the controller 400 obtains a supply interval correction coefficient based on the fuel cell temperature using a map shown in FIG. 8. In FIG. 8, a vertical axis represents the supply interval correction coefficient and a horizontal axis represents the fuel cell temperature. The supply interval correction coefficient decreases with an increase in the fuel cell temperature. That is, the correction coefficient is so set that the supply interval decreases with an increase in the fuel cell temperature.

In Step S220, the controller 400 corrects the basic supply interval using the supply interval correction coefficient and sets this as the supply interval.

After setting the supply interval, the controller 400 supplies hydrogen at the set interval in Step S120 of the flow chart of FIG. 4.

Since the cross-leak amount of oxygen increases with an increase in the fuel cell temperature, hydrogen can be supplied at a more appropriate interval by correcting the supply interval as described above.

Example 2

Example 2 differs from Example 1 in steps corresponding to Steps S200, S210 of FIG. 5. In Example 2, the basic supply interval is corrected based on a wet state in the fuel cell instead of the fuel cell temperature.

In the step corresponding to Step S200 of FIG. 5, the controller 400 reads a degree of wetness in the fuel cell. The degree of wetness may be detected by a known technique. For example, it may be obtained based on an alternating current impedance or may be estimated from the fuel cell temperature or the like when the idle stop is started.

Figure 9:
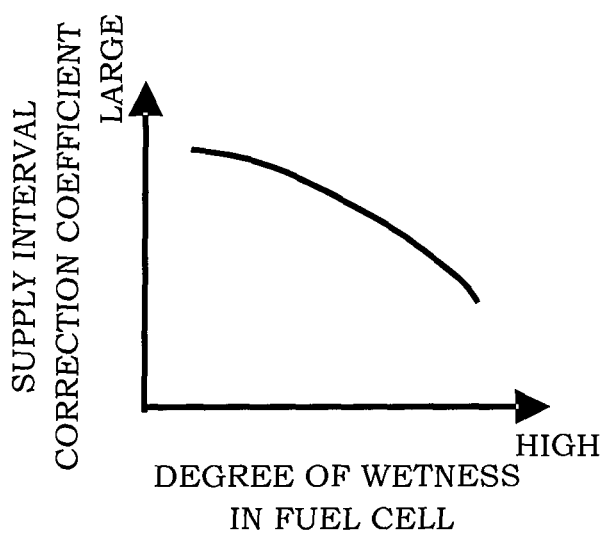
FIG. 9 is a map showing a relationship between degree of wetness and supply interval correction coefficient.

In the step corresponding to Step S210, the controller 400 obtains the supply interval correction coefficient based on the degree of wetness using a map shown in FIG. 9. In FIG. 9, a vertical axis represents the supply interval correction coefficient and a horizontal axis represents the degree of wetness. The supply interval correction coefficient decreases with an increase in the degree of wetness.

Since the cross-leak amount of oxygen increases with an increase in the degree of wetness, hydrogen can be supplied at a more appropriate interval by correcting the supply interval as described above.

Example 3

Example 3 differs from Example 1 in steps corresponding to Steps S200, S210 of FIG. 5. In Example 3, the basic supply interval is corrected based on an idle stop duration instead of the fuel cell temperature.

In the step corresponding to Step S200 of FIG. 5, the controller 400 reads a duration after the start of the idle stop.

Figure 10:
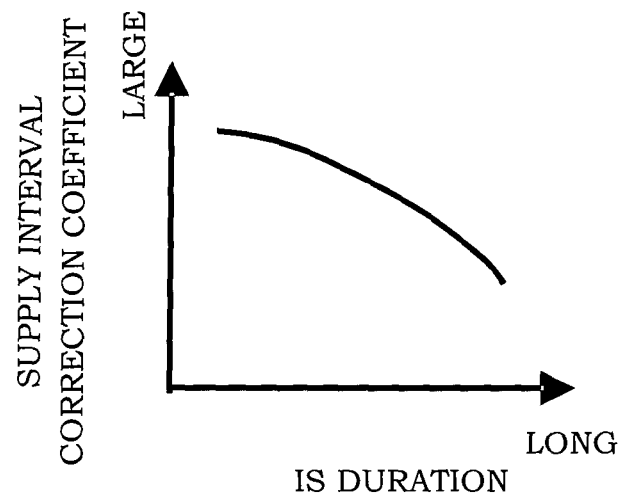
FIG. 10 is a map showing a relationship between idle stop duration and supply interval correction coefficient.
Figure 11:
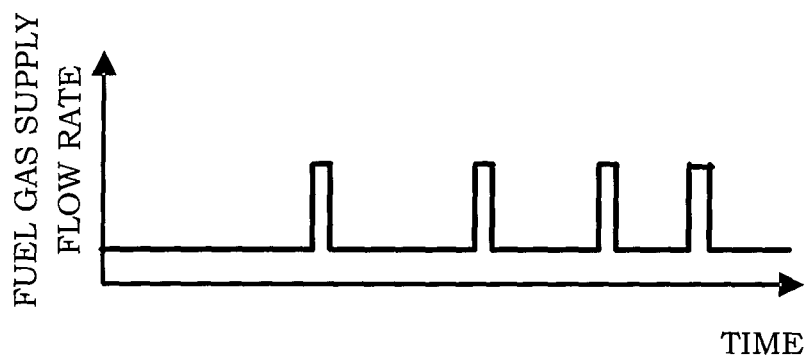
FIG. 11 is a time chart of supply intervals corrected according to the idle stop duration.

In the step corresponding to Step S210 of FIG. 5, the controller 400 obtains the supply interval correction coefficient based on the idle stop duration using a map shown in FIG. 10. In FIG. 10, a vertical axis represents the supply interval correction coefficient and a horizontal axis represents the idle stop duration. The supply interval correction coefficient decreases with an increase in the idle stop duration. That is, the supply interval gradually decreases as shown in FIG. 11 with an increase in the idle stop duration.

As the idle stop duration increases, the fuel cell temperature decreases and condensed water is produced. If the degree of wetness increases due to the condensed water, the cross-leak amount of oxygen increases. Accordingly, hydrogen can be supplied at a more appropriate interval by setting the supply interval shorter with an increase in the idle stop duration. It should be noted that although the supply interval is corrected according to the degree of wetness substantially as in Example 2 in the present example, there is an advantage of eliminating the need for the measurement of the degree of wetness as compared with Example 2.

Example 4

Example 4 differs from Example 1 in steps corresponding to Steps S200, S210 of FIG. 5. In Example 4, the basic supply interval is corrected based on a fuel cell voltage instead of the fuel cell temperature. The fuel cell voltage used here is a voltage of the entire fuel cell stack 1. The voltage of the entire fuel cell stack 1 may be calculated by installing the cell voltage sensor 2 for each unit cell or installing the cell voltage sensor 2 for each cell group. Of course, a sensor for detecting the voltage of the entire fuel cell stack 1 may be provided.

In the step corresponding to Step S200 of FIG. 5, the controller 400 reads the fuel cell voltage.

Figure 12:
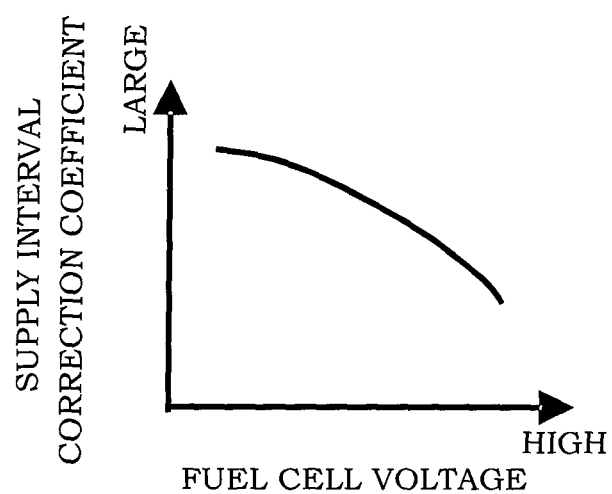
FIG. 12 is a map showing a relationship between fuel cell voltage and supply interval correction coefficient.

In the step corresponding to Step S210 of FIG. 5, the controller 400 obtains the supply interval correction coefficient based on the fuel cell voltage using a map of FIG. 12. In FIG. 12, a vertical axis represents the supply interval correction coefficient and a horizontal axis represents the fuel cell voltage. The supply interval correction coefficient decreases with an increase in the fuel cell voltage. This is to shorten the supply interval since an oxidation reaction is more likely to occur and a cathode electrode is more likely to be deteriorated with an increase in the fuel cell voltage.

Figure 13:
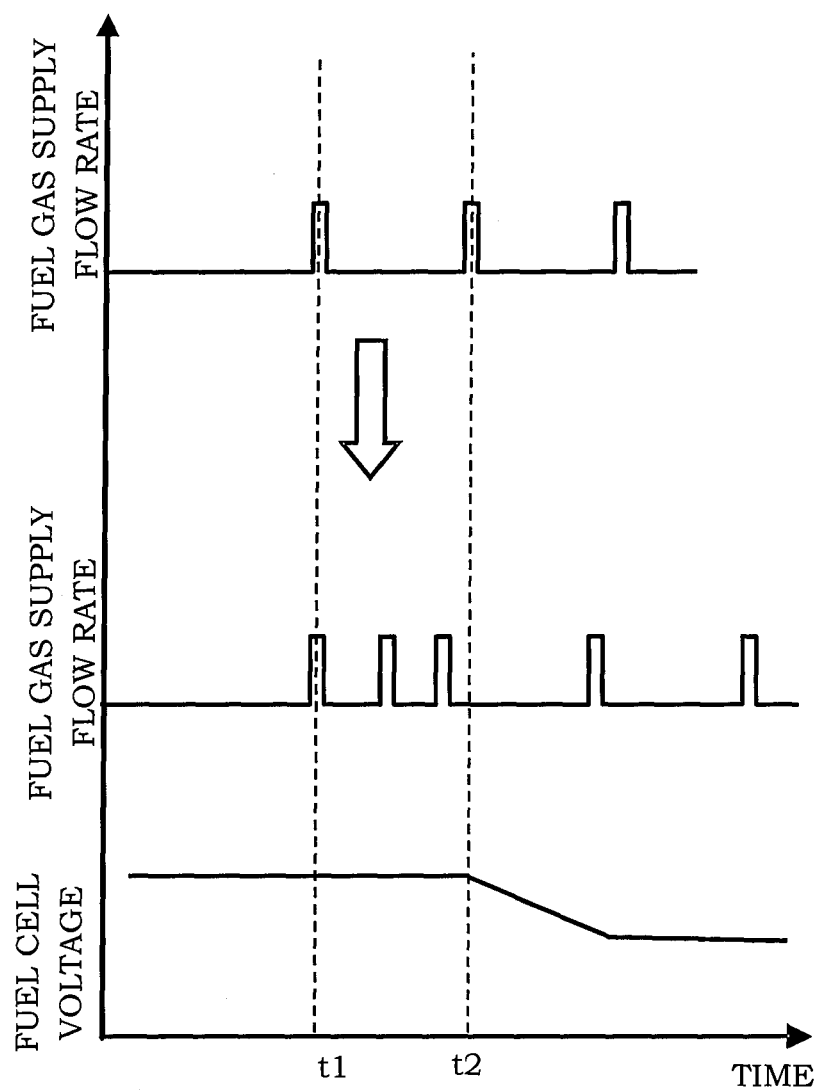
FIG. 13 is a time chart in the case of a correction according to the fuel cell voltage.

A time chart when Example 4 is carried out is shown in FIG. 13. An upper part shows the basic supply interval, a middle part shows the corrected supply interval and a lower part shows the fuel cell voltage. The supply interval is made shorter than the basic supply interval by the correction while the fuel cell voltage is kept relatively high after the start of the idle stop (period between t1 and t2). Thereafter, if the fuel cell voltage decreases, the supply interval correction coefficient increases by an amount corresponding to a reduction in the fuel cell voltage and the supply interval becomes longer than the period t1 to t2 (after t2).

In any of Examples 1 to 4 described above, the hydrogen supply interval is set to be shorter under a condition that the cross-leak amount of oxygen increases.

Effects of the present embodiment described above are summarized.

In the fuel cell system for supplying air to ensure responsiveness at a return during an idle stop, hydrogen is intermittently supplied to the anode 1A at the basic supply interval, which is set in advance and capable of suppressing the generation of carbon dioxide in the cathode 10, during the idle stop. This can suppress the occurrence of the uneven distribution of gas during the idle stop and suppress the deterioration of the electrode catalyst without using a pressure sensor or the like. In this way, the idle stop time can be set to be longer and fuel economy performance can be improved.

Since the controller 400 corrects the basic supply interval such that the supply interval decreases with an increase in the fuel cell temperature, the deterioration of the electrode catalyst can be suppressed even if the cross-leak amount of nitrogen or oxygen from the cathode 10 to the anode 1A increases.

Since the controller 400 corrects the basic supply interval so that the supply interval decreases with an increase in the wetness of the fuel cell stack 1, the deterioration of the electrode catalyst can be suppressed even if the cross-leak amount of nitrogen or oxygen from the cathode 1C to the anode 1A increases.

Since the controller 400 corrects the basic supply interval such that the supply interval decreases with an increase in the idle stop duration, the deterioration of the electrode catalyst can be suppressed even if the cross-leak amount of nitrogen or oxygen from the cathode 10 to the anode 1A increases.

The controller 400 can suppress the deterioration of the electrode catalyst even if the cross-leak amount of nitrogen or oxygen from the cathode 1C to the anode 1A increases by correcting the basic supply interval such that the supply interval decreases with an increase in the cell voltage, the cell group voltage or the total voltage of the fuel cell stack 1.

Since the controller 400 prohibits the supply of hydrogen during the idle stop if the pressure in the anode 1A exceeds the predetermined value, the deterioration of the electrolyte membrane 1B due to an excessive increase in a differential pressure between the cathode 10 and the anode 1A can be prevented.

In the anode system dead-end system of the present embodiment, nitrogen gas is likely to be unevenly distributed in the anode 1A even during normal driving as compared with the system for circulating the anode gas. Further, it is also not possible to resolve the uneven distribution of gas utilizing a circulation device. Thus, an effect of suppressing the uneven distribution of gas by the above control is remarkably large.

Second Embodiment

A second embodiment is similar to the first embodiment in the system configuration and the hydrogen supply interval and differs from the first embodiment in that a supply flow rate in supplying hydrogen during an idle stop is set according to a state of a fuel cell system. The setting of the supply flow rate of hydrogen is described below.

Figure 14:
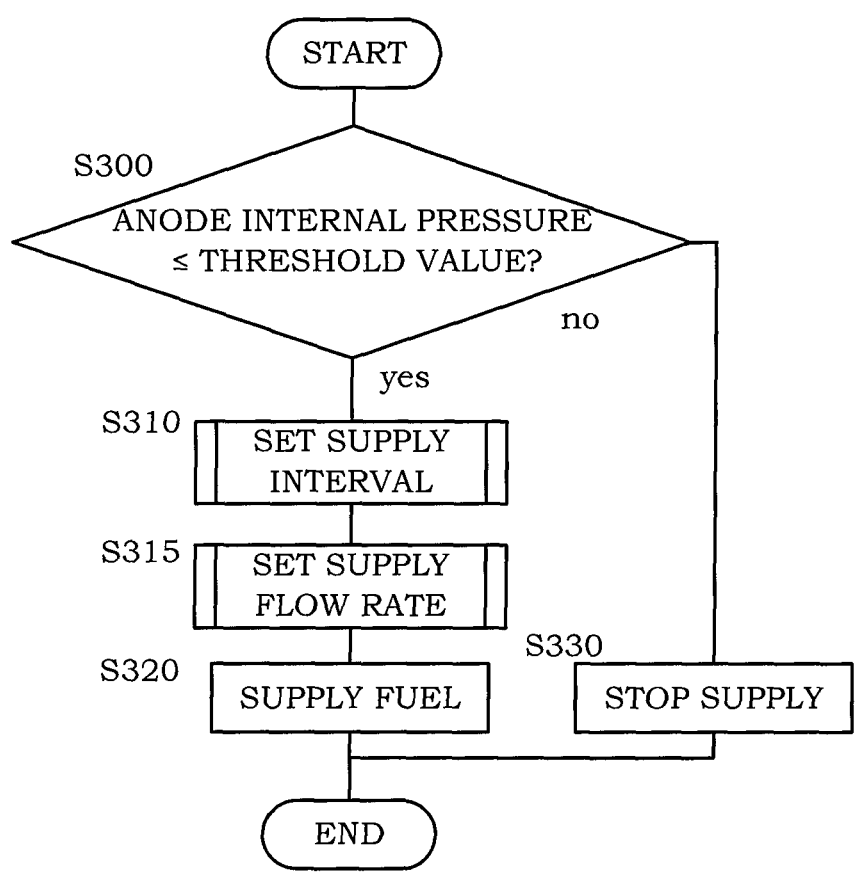
FIG. 14 is a flow chart showing a control routine for hydrogen supply during an idle stop executed by a controller in a second embodiment.

FIG. 14 is a flow chart showing a control routine for hydrogen supply during an idle stop executed by a controller 400 in the present embodiment. This control routine is repeatedly executed, for example, at an interval of about 10 msec.

Since Steps S300, S310, S320 and S330 are similar to Steps S100, S110, S120 and S130 of FIG. 4, they are not described. However, the basic supply interval used in Step S310 is set based on an experiment conducted with a supply flow rate set at a basic supply flow rate to be described later.

Step S315 is described below.

Figure 15:
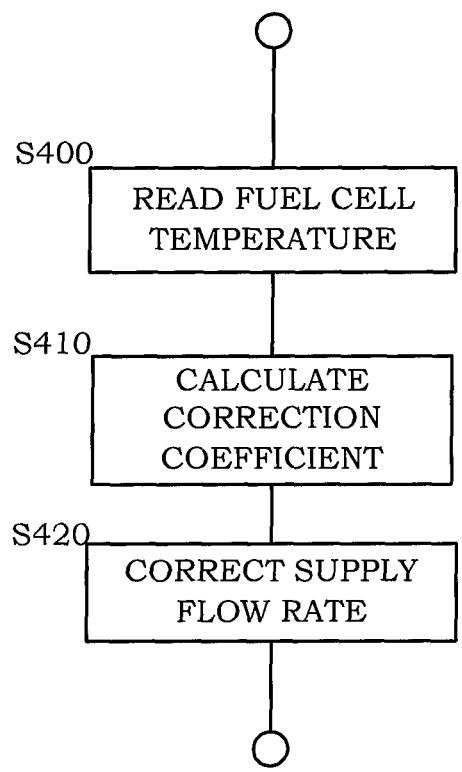
FIG. 15 is a subroutine for supply flow rate correction executed by the controller in the second embodiment.

In Step S315, the controller 400 sets the supply flow rate of hydrogen in accordance with a subroutine shown in FIG. 15. Specifically, a magnitude in a vertical axis direction of FIG. 6 is set. It should be noted that a time during which supply continues is equal to a duration at the basic supply interval.

Figure 16:
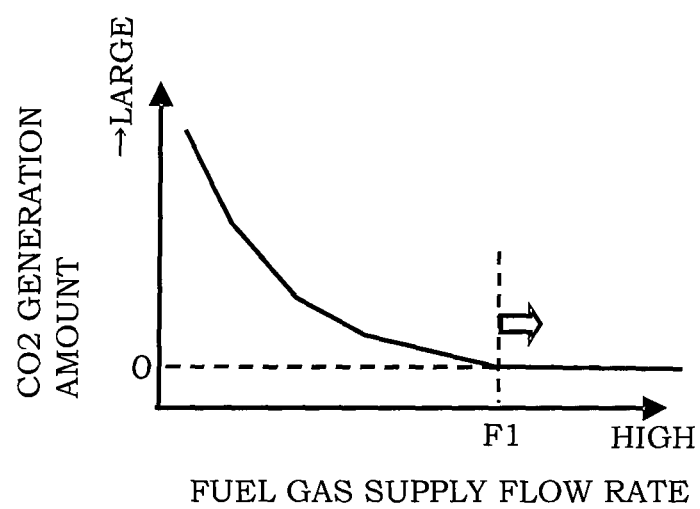
FIG. 16 is a graph showing a relationship between supply flow rate of hydrogen and carbon dioxide generation amount in a cathode.

The subroutine of FIG. 15 is for correcting the basic supply flow rate set in advance. The basic supply flow rate is set by an experiment for each specification of an electrolyte membrane similarly to the basic supply interval. FIG. 16 is a graph showing a relationship between supply flow rate of hydrogen and carbon dioxide generation amount in a cathode obtained from the experiment. A vertical axis represents the carbon dioxide generation amount and a horizontal axis represents the supply flow rate. As shown in FIG. 16, carbon dioxide is not generated if the supply flow rate is not lower than F1. However, if the supply flow rate is lower than F1, the carbon dioxide generation amount increases with a decrease in the supply flow rate. Thus, the basic supply flow rate is set, for example, at F1 or higher.

The processings of Steps S400, S410 and S420 of FIG. 15 are different from those of Steps S200, S210 and S220 of FIG. 5 in using a map different from the map for calculating the correction coefficient used in Step S210, but basically similar thereto. In calculating the correction coefficient, various parameters can be used as in the first embodiment.

Example 1

In Step S400, the controller 400 reads fuel cell temperature.

Figure 17:
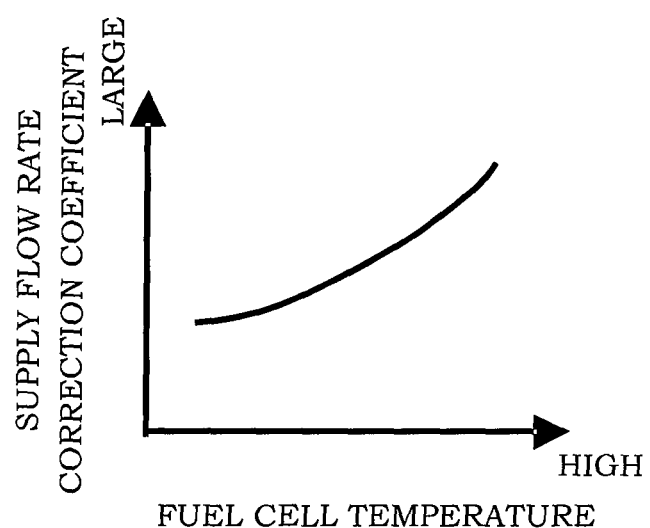
FIG. 17 is a map showing a relationship between fuel cell temperature and supply flow rate correction coefficient.

In Step S410, the controller 400 obtains a correction coefficient based on the fuel cell temperature. Here, a map shown in FIG. 17 is used. In FIG. 17, a vertical axis represents a supply flow rate correction coefficient and a horizontal axis represents the fuel cell temperature. The supply flow rate correction coefficient increases with an increase in the fuel cell temperature.

In Step S420, the controller 400 corrects the basic supply flow rate using the supply flow rate correction coefficient. By this, more hydrogen can be supplied with an increase in the fuel cell temperature.

Example 2

Example 2 differs from Example 1 in steps corresponding to Steps S400, S410 of FIG. 15. In Example 2, the basic supply flow rate is corrected based on a wet state in the fuel cell instead of the fuel cell temperature. The degree of wetness is as described in Step S200 of FIG. 5.

Figure 18:
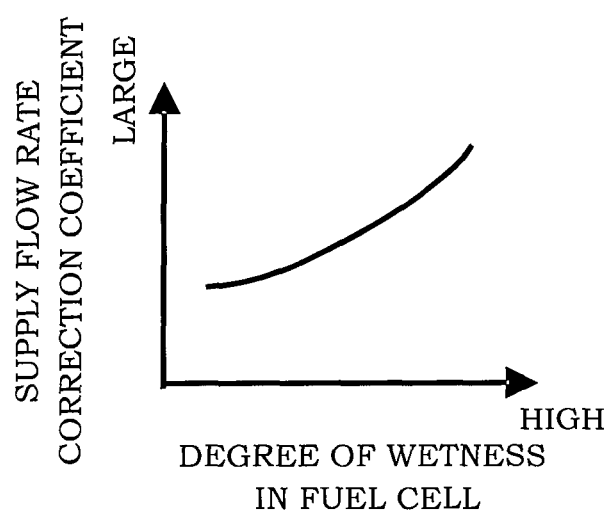
FIG. 18 is a map showing a relationship between degree of wetness and supply flow rate correction coefficient.

In the step corresponding to Step S410, the controller 400 obtains the supply flow rate correction coefficient based on the degree of wetness using a map shown in FIG. 18. In FIG. 18, a vertical axis represents the supply flow rate correction coefficient and a horizontal axis represents the degree of wetness. The supply flow rate correction coefficient increases with an increase in the degree of wetness.

Since the cross-leak amount of oxygen increases with an increase in the degree of wetness, a more appropriate amount of hydrogen can be supplied by correcting the supply flow rate as described above.

Example 3

Example 3 differs from Example 1 in steps corresponding to Steps S400, S410 of FIG. 15. In Example 3, the basic supply flow rate is corrected based on an idle stop duration instead of the fuel cell temperature.

In the step corresponding to Step S400 of FIG. 15, the controller 400 reads a duration after the start of the idle stop.

Figure 19:
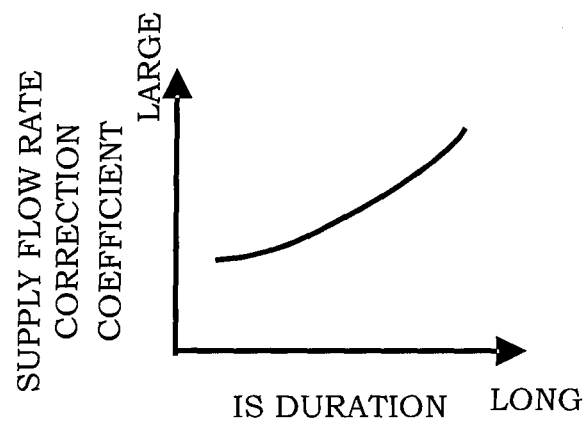
FIG. 19 is a map showing a relationship between idle stop duration and supply flow rate correction coefficient.
Figure 20:
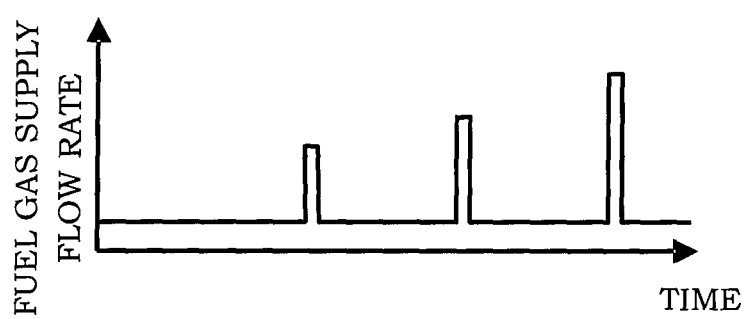
FIG. 20 is a time chart of supply intervals corrected according to the idle stop duration.

In the step corresponding to Step S410 of FIG. 15, the controller 400 obtains the supply flow rate correction coefficient based on the idle stop duration using a map shown in FIG. 19. In FIG. 19, a vertical axis represents the supply flow rate correction coefficient and a horizontal axis represents the idle stop duration. The supply flow rate correction coefficient decreases with an increase in the idle stop duration. That is, the supply flow rate gradually decreases as shown in FIG. 20 with an increase in the idle stop duration.

As the idle stop duration increases, the fuel cell temperature decreases and condensed water is produced. If the degree of wetness increases due to the condensed water, the cross-leak amount of oxygen increases. Accordingly, a more appropriate amount of hydrogen can be supplied by increasing the supply flow rate with an increase in the idle stop duration. It should be noted that although the supply flow rate is corrected according to the degree of wetness substantially as in Example 2 in the present example, there is an advantage of eliminating the need for the measurement of the degree of wetness as compared with Example 2.

Example 4

Example 4 differs from Example 1 in steps corresponding to Steps S400, S410 of FIG. 15. In Example 4, the basic supply flow rate is corrected based on a fuel cell voltage instead of the fuel cell temperature. The fuel cell voltage used here is not described since it is as described in the first embodiment.

In the step corresponding to Step S400 of FIG. 15, the controller 400 reads the fuel cell voltage.

Figure 21:
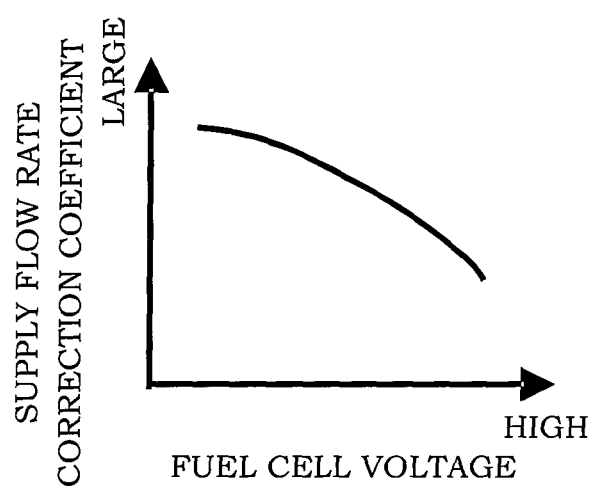
FIG. 21 is a map showing a relationship between fuel cell voltage and supply flow rate correction coefficient.

In the step corresponding to Step S410 of FIG. 15, the controller 400 obtains the supply flow rate correction coefficient based on the fuel cell voltage using a map of FIG. 21. In FIG. 21, a vertical axis represents the supply flow rate correction coefficient and a horizontal axis represents the fuel cell voltage. The supply flow rate correction coefficient decreases with an increase in the fuel cell voltage. This is to increase the supply flow rate since an oxidation reaction is more likely to occur and a cathode electrode is more likely to be deteriorated with an increase in the fuel cell voltage.

Figure 22:
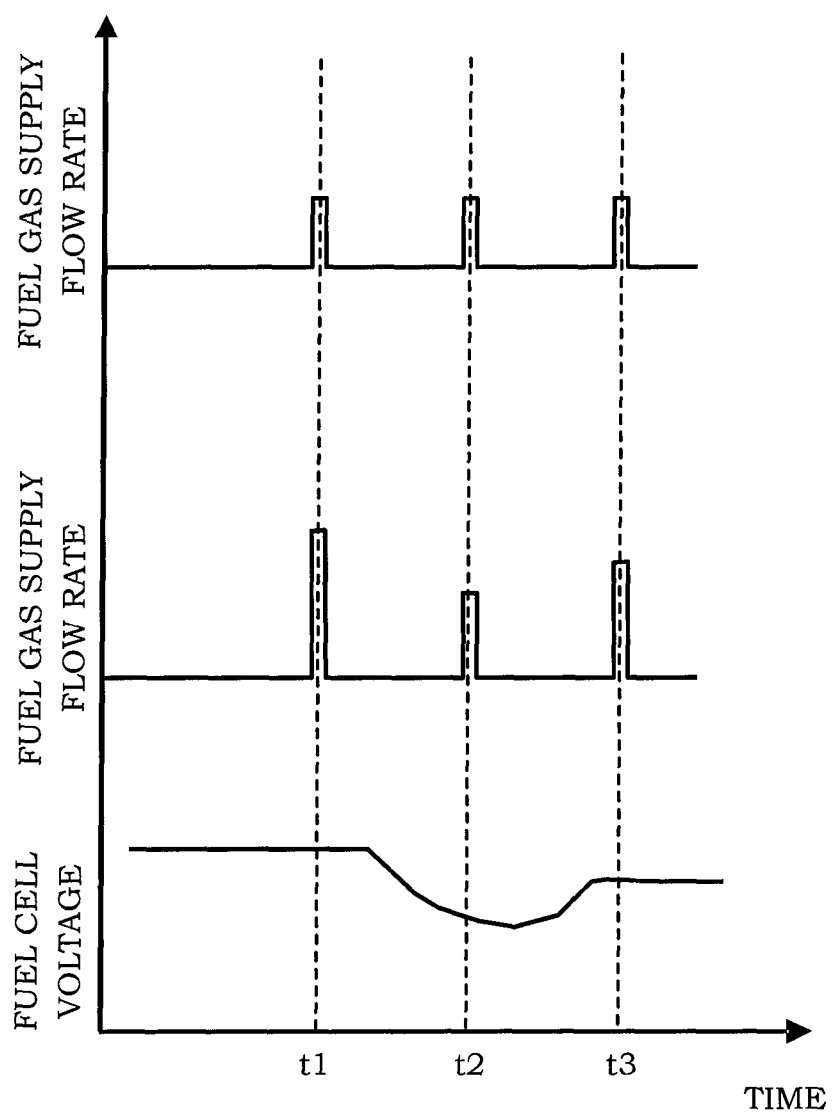
FIG. 22 is a time chart in the case of a correction according to the fuel cell voltage.

A time chart when Example 4 is carried out is shown in FIG. 22. An upper part shows the basic supply flow rate, a middle part shows the corrected supply flow rate and a lower part shows the fuel cell voltage. The supply flow rate is made higher than the basic supply flow rate by the correction while the fuel cell voltage is kept relatively high after the start of the idle stop (t1). Thereafter, if the fuel cell voltage decreases, the supply flow rate correction coefficient decreases by an amount corresponding to a reduction in the fuel cell voltage and the supply flow rate becomes lower than that at t1 (t2). When the fuel cell voltage increases again, the supply flow rate also increases (t3).

In any of Examples 1 to 4 described above, the supply flow rate of hydrogen is set to be higher under a condition that the cross-leak amount of oxygen increases.

As just described, if the basic supply flow rate is corrected according to a state of the fuel cell system, it is possible to execute, for example, a control of setting the basic supply flow rate at a boundary value above which carbon dioxide is not generated in the cathode and increasing the supply flow rate in a situation where the cross-leak amount of oxygen increases. According to this, it is possible to supply hydrogen necessary to consume cross-leaked oxygen and suppress a wasteful supply of hydrogen.

As described above, according to the present embodiment, the following effects are obtained in addition to effects similar to those of the first embodiment.

Since a supply flow rate per unit time of the hydrogen supply intermittently carried out at the basic supply interval is the basic supply flow rate set in advance and capable of suppressing the generation of carbon dioxide in the cathode 1C, hydrogen is supplied at an appropriate supply flow rate at an appropriate timing. As a result, the deterioration of the electrode catalyst can be more reliably suppressed.

(9) Since the controller 400 corrects the basic supply flow rate such that the supply flow rate increases with an increase in the fuel cell temperature, the deterioration of the electrode catalyst can be suppressed even if the cross-leak amount of nitrogen or oxygen from the cathode 1C to the anode 1A increases.

(10) Since the controller 400 corrects the basic supply flow rate such that the supply flow rate increases with an increase in the wetness of the fuel cell stack 1, the deterioration of the electrode catalyst can be suppressed even if the cross-leak amount of nitrogen or oxygen from the cathode 1C to the anode 1A increases.

(11) Since the controller 400 corrects the basic supply flow rate such that the supply flow rate increases with an increase in the idle stop duration, the deterioration of the electrode catalyst can be suppressed even if the cross-leak amount of nitrogen or oxygen from the cathode 1C to the anode 1A increases.

(12) Since the controller 400 corrects the basic supply flow rate such that the supply flow rate increases with an increase in the cell voltage, the cell group voltage or the total voltage, the deterioration of the electrode catalyst can be suppressed even if the cross-leak amount of nitrogen or oxygen from the cathode 1C to the anode 1A increases.

Third Embodiment

A third embodiment is similar to the first embodiment in the system configuration and the hydrogen supply interval, but differs from the first embodiment in that a supply time in supplying hydrogen during an idle stop is set according to a state of a fuel cell system. The setting of a hydrogen supply time is described below.

The amount of hydrogen supplied to suppress the occurrence of an uneven distribution of gas during an idle stop is determined by a product of the supply flow rate and the supply time. The hydrogen supply amount is increased by increasing the supply flow rate with an increase in the cross-leak amount of oxygen in the second embodiment, whereas a supply amount is set according to the state of the fuel cell system by changing the supply time without changing the supply flow rate in the present embodiment. It should be noted that the supply flow rate is equal to a flow rate at a basic supply interval.

Figure 23:
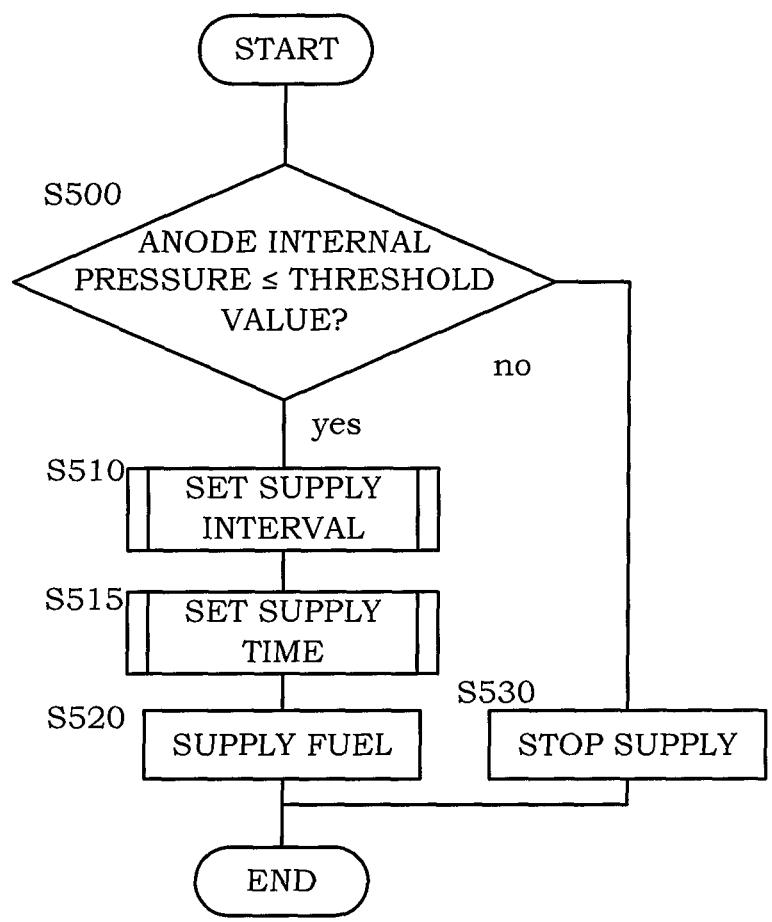
FIG. 23 is a flow chart showing a control routine for hydrogen supply during an idle stop executed by a controller in a third embodiment.

FIG. 23 is a flow chart showing a control routine for hydrogen supply during an idle stop executed by a controller 400 in the present embodiment. This control routine is repeatedly executed, for example, at an interval of about 10 msec.

Since Steps S500, S510, S520 and S530 are similar to Steps S100, S110, S120 and S130 of FIG. 4, they are not described. However, the basic supply interval used in Step S510 is set based on an experiment conducted with a supply time set at a basic supply time to be described later.

Step S515 is described below.

Figure 24:
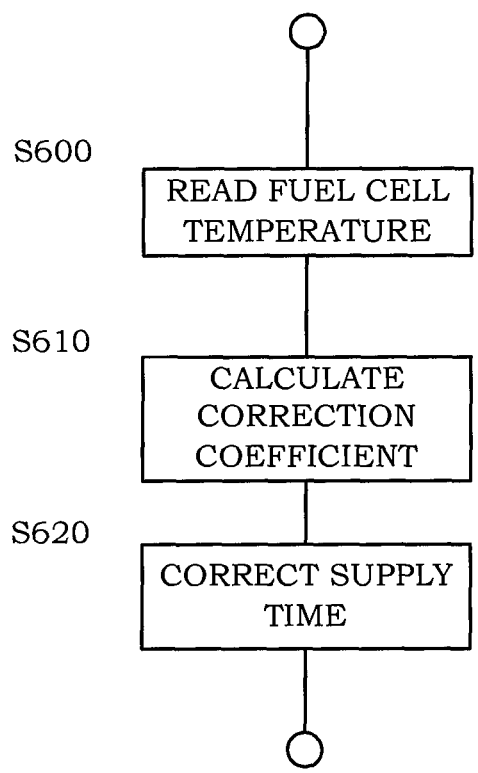
FIG. 24 is a subroutine for supply time correction executed by the controller in the third embodiment.

In Step S515, the controller 400 sets the hydrogen supply time in accordance with a subroutine shown in FIG. 24. Specifically, a magnitude in a horizontal axis direction of FIG. 6 is set. It should be noted that a supply flow rate per unit time is equal to a supply flow rate at the basic supply interval.

Figure 25:
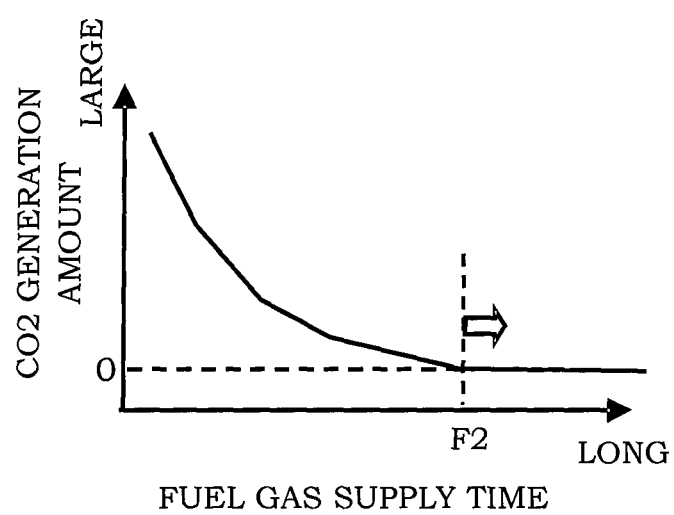
FIG. 25 is a graph showing a relationship between hydrogen supply time and carbon dioxide generation amount in a cathode.

The subroutine of FIG. 24 is for correcting the basic supply time set in advance. The basic supply time is set by an experiment for each specification of an electrolyte membrane similarly to the basic supply interval. FIG. 25 is a graph showing a relationship between hydrogen supply time and carbon dioxide generation amount in a cathode obtained from the experiment. A vertical axis represents the carbon dioxide generation amount and a horizontal axis represents the supply time. As shown in FIG. 25, carbon dioxide is not generated if the supply time is not shorter than F2. However, if the supply time is shorter than F2, the carbon dioxide generation amount increases with a decrease in the supply time. Thus, the basic supply time is set, for example, at F2 or longer.

The processings of Steps S600, S610 and S620 of FIG. 24 are different from those of Steps S400, S410 and S420 of FIG. 15 in using a map different from the map for calculating the correction coefficient used in Step S410 of FIG. 15, but basically similar thereto. In calculating the correction coefficient, various parameters can be used as in the second embodiment.

Example 1

In Step S600, the controller 400 reads fuel cell temperature.

Figure 26:
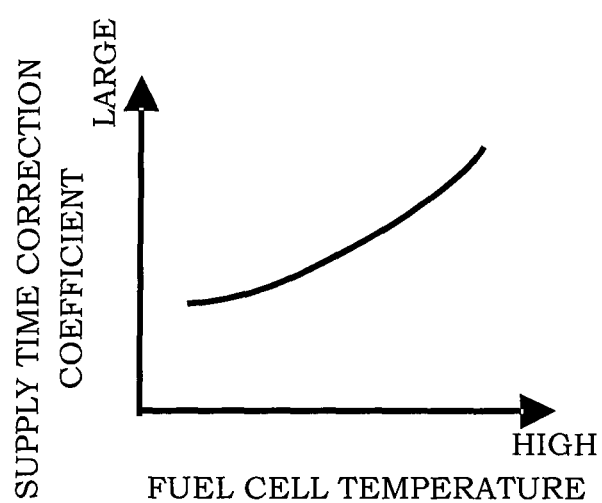
FIG. 26 is a map showing a relationship between fuel cell temperature and supply time correction coefficient.

In Step S610, the controller 400 obtains a correction coefficient based on the fuel cell temperature. Here, a map shown in FIG. 26 is used. In FIG. 26, a vertical axis represents a supply time correction coefficient and a horizontal axis represents the fuel cell temperature. The supply time correction coefficient increases with an increase in the fuel cell temperature.

In Step S620, the controller 400 corrects the basic supply time using the supply time correction coefficient. By this, a supply time per one time in supplying hydrogen in a pulse increases with an increase in the fuel cell temperature.

Example 2

Example 2 differs from Example 1 in steps corresponding to Steps S600, S610 of FIG. 24. In Example 2, the basic supply time is corrected based on a wet state in the fuel cell instead of the fuel cell temperature. The degree of wetness is as described in Step S200 of FIG. 5.

Figure 27:
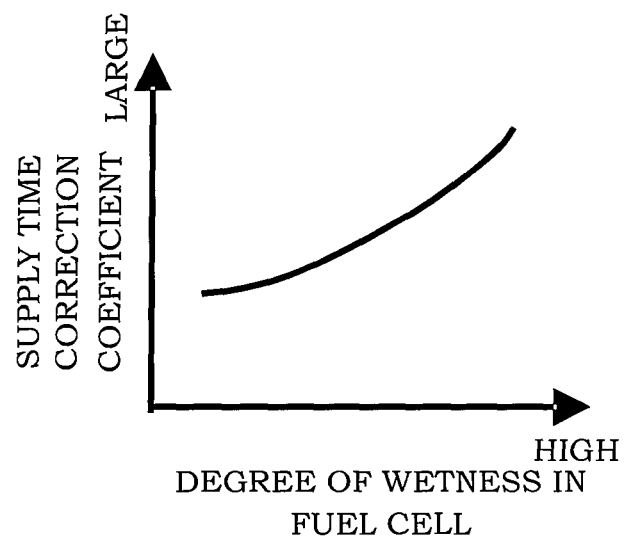
FIG. 27 is a map showing a relationship between degree of wetness and supply time correction coefficient.

In the step corresponding to Step S610, the controller 400 obtains the supply time correction coefficient based on the degree of wetness using a map shown in FIG. 27. In FIG. 27, a vertical axis represents the supply time correction coefficient and a horizontal axis represents the degree of wetness. The supply time correction coefficient increases with an increase in the degree of wetness.

Since the cross-leak amount of oxygen increases with an increase in the degree of wetness, a more appropriate amount of hydrogen can be supplied by correcting the supply time as described above.

Example 3

Example 3 differs from Example 1 in steps corresponding to Steps S600, S610 of FIG. 24. In Example 3, the basic supply time is corrected based on an idle stop duration instead of the fuel cell temperature.

In the step corresponding to Step S600 of FIG. 24, the controller 400 reads a duration after the start of the idle stop.

Figure 28:
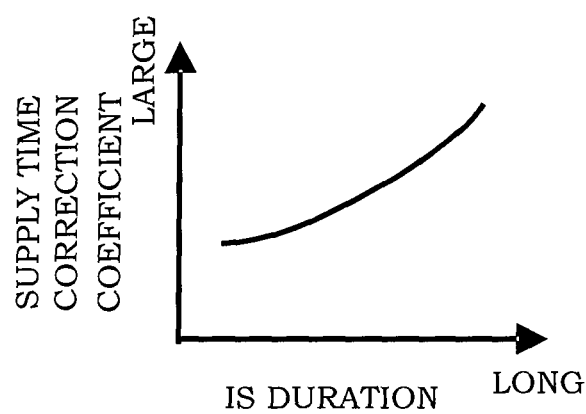
FIG. 28 is a map showing a relationship between idle stop duration and supply time correction coefficient.
Figure 29:
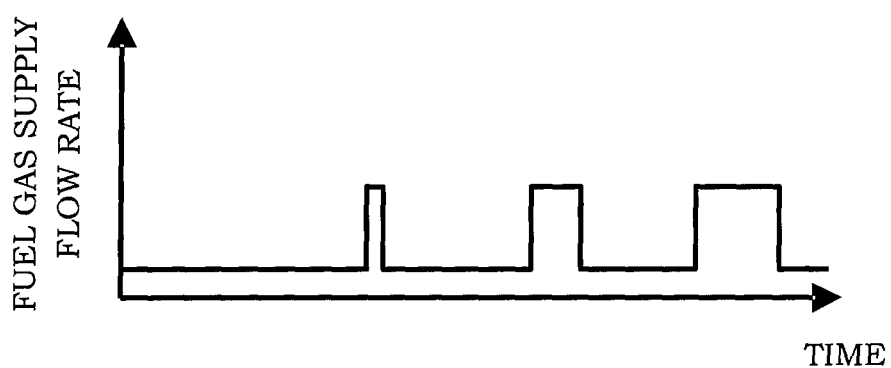
FIG. 29 is a time chart of supply flow rates corrected according to the idle stop duration.

In the step corresponding to Step S610 of FIG. 24, the controller 400 obtains the supply time correction coefficient based on the idle stop duration using a map shown in FIG. 28. In FIG. 28, a vertical axis represents the supply time correction coefficient and a horizontal axis represents the idle stop duration. The supply time correction coefficient decreases with an increase in the idle stop duration. That is, the supply time gradually increases with an increase in the idle stop duration as shown in FIG. 29.

As the idle stop duration increases, the fuel cell temperature decreases and condensed water is produced. If the degree of wetness increases due to the condensed water, the cross-leak amount of oxygen increases. Accordingly, a more appropriate amount of hydrogen can be supplied by increasing the supply time with an increase in the idle stop duration. It should be noted that although the supply time is corrected according to the degree of wetness substantially as in Example 2 in the present example, there is an advantage of eliminating the need for the measurement of the degree of wetness as compared with Example 2.

Example 4

Example 4 differs from Example 1 in steps corresponding to Steps S600, S610 of FIG. 24. In Example 4, the basic supply time is corrected based on a fuel cell voltage instead of the fuel cell temperature. The fuel cell voltage used here is not described since it is as described in the first embodiment.

In the step corresponding to Step S600 of FIG. 24, the controller 400 reads the fuel cell voltage.

Figure 30:
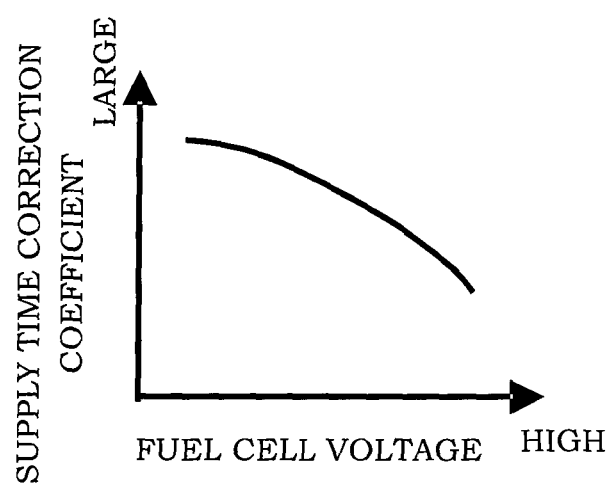
FIG. 30 is a map showing a relationship between fuel cell voltage and supply time correction coefficient.

In the step corresponding to Step S610 of FIG. 24, the controller 400 obtains the supply time correction coefficient based on the fuel cell voltage using a map of FIG. 30. In FIG. 30, a vertical axis represents the supply time correction coefficient and a horizontal axis represents the fuel cell voltage. This is to extend the supply time since an oxidation reaction is more likely to occur and a cathode electrode is more likely to be deteriorated with an increase in the fuel cell voltage.

Figure 31:
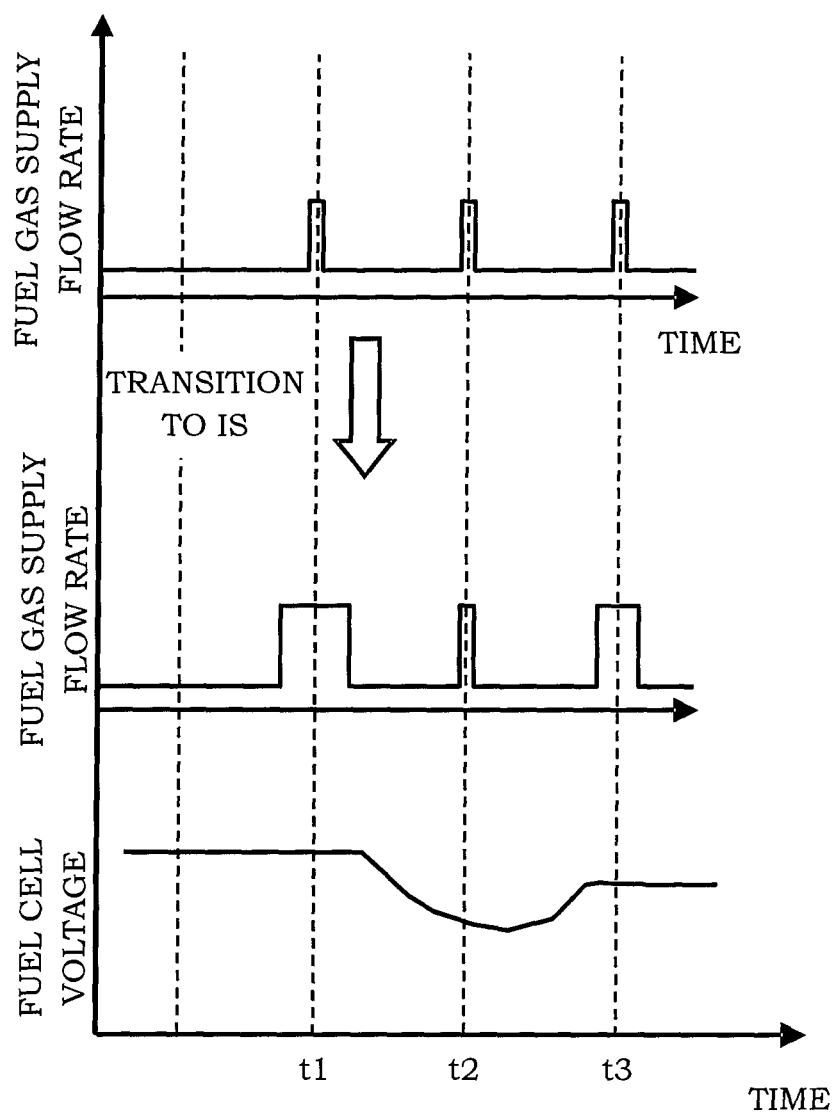
FIG. 31 is a time chart in the case of a correction according to the fuel cell voltage.

A time chart when Example 4 is carried out is shown in FIG. 31. An upper part shows the basic supply time, a middle part shows the corrected supply time and a lower part shows the fuel cell voltage. The supply time is made longer than the basic supply time by the correction while the fuel cell voltage is kept relatively high after the start of the idle stop (t1). Thereafter, if the fuel cell voltage decreases, the supply time correction coefficient decreases by an amount corresponding to a reduction in the fuel cell voltage and the supply time becomes shorter than that at t1 (t2). When the fuel cell voltage increases again, the supply time also increases (t3).

In any of Examples 1 to 4 described above, the hydrogen supply time is set to be longer under a condition that the cross-leak amount of oxygen increases.

As just described, if the basic supply time is corrected according to a state of the fuel cell system, it is possible to execute, for example, a control of setting the basic supply time at a boundary value above which carbon dioxide is not generated in the cathode and increasing the supply time in a situation where the cross-leak amount of oxygen increases. According to this, it is possible to supply hydrogen necessary to consume cross-leaked oxygen and suppress a wasteful supply of hydrogen.

As described above, according to the present embodiment, the following effects are obtained in addition to effects similar to those of the first embodiment.

Since a supply time per one time of the hydrogen supply intermittently carried out at the basic supply interval is the basic supply time set in advance and capable of suppressing the generation of carbon dioxide in the oxidant electrode, hydrogen is supplied at an appropriate supply flow rate at an appropriate timing. As a result, the deterioration of the electrode catalyst can be more reliably suppressed.

Since the controller 400 corrects the basic supply time such that the supply time increases with an increase in the fuel cell temperature, the deterioration of the electrode catalyst can be suppressed even if the cross-leak amount of nitrogen or oxygen from the cathode 1C to the anode 1A increases.

Since the controller 400 corrects the basic supply time such that the supply time increases with an increase in the wetness of the fuel cell stack 1, the deterioration of the electrode catalyst can be suppressed even if the cross-leak amount of nitrogen or oxygen from the cathode 1C to the anode 1A increases.

Since the controller 400 corrects the basic supply time such that the supply time increases with an increase in the idle stop duration, the deterioration of the electrode catalyst can be suppressed even if the cross-leak amount of nitrogen or oxygen from the cathode 1C to the anode 1A increases.

Since the controller 400 corrects the basic supply time such that the supply time increases with an increase in the cell voltage, the cell group voltage or the total voltage, the deterioration of the electrode catalyst can be suppressed even if the cross-leak amount of nitrogen or oxygen from the cathode 1C to the anode 1A increases.

It should be noted that although the anode system dead-end system has been described in each of the above embodiments, the present invention can be similarly applied also to an anode system recirculation system for circulating hydrogen from the hydrogen exhaust pipe 105 to the hydrogen supply pipe 102.

Although the embodiments of the present invention have been described, the above embodiments are only an illustration of some application examples of the present invention and not intended to limit the technical scope of the present invention to the specific configurations of the above embodiments.

This application claims a priority of Japanese Patent Application No. 2011-137298 filed with the Japan Patent Office on Jun. 21, 2011, all the contents of which are hereby incorporated by reference.

The invention claimed is:

1. A fuel cell system, comprising:
   a controller programmed to execute a stop process of stopping an output from a fuel cell when a required power generation amount for the fuel cell is smaller than a predetermined power generation amount and to supply oxidant during a stop process period,
   wherein fuel gas is intermittently supplied to a fuel electrode at a basic supply interval, which is set in advance and at which carbon dioxide is not generated in an oxidant electrode, during the stop process period.

2. The fuel cell system according to claim 1, comprising:
   a temperature device adapted to detect temperature of the fuel cell;
   wherein the controller is programmed to correct the basic supply interval such that the supply interval decreases with an increase in the temperature of the fuel cell.

3. The fuel cell system according to claim 1, wherein the controller is further programmed to:

correct the basic supply interval such that the supply interval decreases with an increase in wetness of the fuel cell.

4. The fuel cell system according to claim 1, wherein the controller is further programmed to:
   detect a duration of the stop process; and
   correct the basic supply interval such that the supply interval decreases with an increase in the duration of the stop process.

5. The fuel cell system according to claim 1, comprising:
   a device adapted to detect at least one of a cell voltage, a cell group voltage or a total voltage of the fuel cell;
   wherein the controller is programmed to correct the basic supply interval such that the supply interval decreases with an increase in at least one of the cell voltage, the cell group voltage or the total voltage.

6. The fuel cell system according to claim 1, wherein:
   supply flow rate per unit time of fuel gas supply intermittently carried out at the basic supply interval is a basic supply flow rate which is set in advance and at which carbon dioxide is not generated in the oxidant electrode.

7. The fuel cell system according to claim 6, comprising:
   a temperature device adapted to detect temperature of the fuel cell;
   wherein the controller is programmed to correct the basic supply flow rate such that the supply flow rate increases with an increase in the temperature of the fuel cell.

8. The fuel cell system according to claim 6, wherein the controller is further programmed to:
   correct the basic supply flow rate such that the supply flow rate increases with an increase in wetness of the fuel cell.

9. The fuel cell system according to claim 6, wherein the controller is further programmed to:
   detect a duration of the stop process;
   correct the basic supply flow rate such that the supply flow rate increases with an increase in the duration of the stop process.

10. The fuel cell system according to claim 6, comprising:
    a device adapted to detect at least one of a cell voltage, a cell group voltage or a total voltage of the fuel cell;
    wherein the controller is programmed to correct the basic supply flow rate such that the supply flow rate increases with an increase in at least one of the cell voltage, the cell group voltage or the total voltage.

11. The fuel cell system according to claim 1, wherein:
    a supply time per one time of fuel gas supply intermittently carried out at the basic supply interval is a basic supply time which is set in advance and during which generation of carbon dioxide can be suppressed in the oxidant electrode.

12. The fuel cell system according to claim 11, comprising:
    a temperature device adapted to detect temperature of the fuel cell;
    wherein the controller is programmed to correct the basic supply time such that the supply time increases with an increase in the temperature of the fuel cell.

13. The fuel cell system according to claim 11, wherein the controller is further programmed to:
    correct the basic supply time such that the supply time increases with an increase in wetness of the fuel cell.

14. The fuel cell system according to claim 11, wherein the controller is further programmed to:
    a device adapted to detect a duration of the stop process; and
    correct the basic supply time such that the supply time increases with an increase in the duration of the stop process.

15. The fuel cell system according to claim 11, comprising:
    a device adapted to detect at least one of a cell voltage, a cell group voltage or a total voltage of the fuel cell;
    wherein the controller is programmed to correct the basic supply time such that the supply time increases with an increase in at least one of the cell voltage, the cell group voltage or the total voltage.

16. The fuel cell system according to claim 1, wherein:
    the supply of the fuel gas during the stop process period is prohibited if a pressure in the fuel electrode exceeds a predetermined value.

17. The fuel cell system according to claim 1, wherein:
    the fuel cell system is an anode system dead-end system configured to exhaust fuel gas exhausted from the fuel electrode without recirculating the exhaust fuel gas to a fuel gas supply passage.

* * * * *